US007487442B2

(12) United States Patent
Cory et al.

(10) Patent No.: US 7,487,442 B2
(45) Date of Patent: Feb. 3, 2009

(54) METHOD, SYSTEM, AND COMPUTER-READABLE MEDIUM FOR THE LAYOUT OF AUTOMATICALLY-PLACED ELEMENTS AND USER-PLACED ELEMENTS IN A CHART

(75) Inventors: Daniel P. Cory, Seattle, WA (US); Johnny H. Lee, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 11/019,035

(22) Filed: Dec. 20, 2004

(65) Prior Publication Data

US 2006/0136825 A1 Jun. 22, 2006

(51) Int. Cl.
*G06F 17/00* (2006.01)
(52) U.S. Cl. .................. 715/243; 715/273; 715/763
(58) Field of Classification Search .................. 715/517, 715/502, 526, 763, 243, 273
See application file for complete search history.

(56) References Cited

U.S. PATENT DOCUMENTS

| 5,848,430 | A  | * | 12/1998 | Takakura et al. ............. 715/521 |
| 6,018,593 | A  | * | 1/2000  | Yamagata .................... 382/201 |
| 6,732,114 | B1 | * | 5/2004  | Aamodt et al. .............. 707/102 |
| 2003/0193502 | A1 | * | 10/2003 | Patel et al. .................. 345/440 |
| 2004/0070582 | A1 | * | 4/2004  | Smith et al. ................. 345/419 |

FOREIGN PATENT DOCUMENTS

WO    WO 92/21097    11/1992

OTHER PUBLICATIONS

SigmaPlot 5.0 User's Guide, SPSS Ince, Chicago, USA, ISBN: 1-56827-251-0, 1998, pp. 1-7, 23-38, and 126-128.*
Budirijanto, Purnomo, et al, "Seamless Texture Atlases", Proceedings of the 2004 Eurographics/ACM SIGGRAPH Symposium on Geometry Processing SGP '04, Jul. 2004, pp. 65-74.*
Bederson, Benjamin B., et al, "Ordered and Quantum Treemaps: Making Effective Use of 2D Space to Display Hierarchies", ACM Transactions on Graphics (TOG), vol. 21, Issue 4, Oct. 2002, pp. 833-854.*
SigmaPlot 5.0 User's Guide, 1998, SPSS Inc., Chapter "QuickStart" pp. 23-38, "Modifying Data Interactively" p. 29, paragraph 1, "Moving and Sizing Graphs and Objects" pp. 126-128.

* cited by examiner

*Primary Examiner*—Laurie Ries
(74) *Attorney, Agent, or Firm*—Merchant & Gould, PC

(57) ABSTRACT

A method, system, and computer-readable medium are provided for determining a layout of automatically-placed elements and user-placed elements in a chart created in a chart application program. User-placed elements in the chart include chart elements that have been moved and/or resized by a user. User-placed elements include chart elements that have been moved and/or resized by a user. Automatically-placed elements include chart elements that have been laid out according to an automatic position and size calculated by the chart application program. The chart application program executes a method including selecting a group of automatically-placed chart elements and user-placed chart elements previously laid out in the chart and automatically laying out the automatically-placed chart elements and the user-placed chart elements according to an automatic position and size calculated by the chart application program. The method further includes reselecting each of the elements from among the automatically laid out elements in the chart, determining whether the selected chart element are user-placed chart elements, and if the selected chart element are user-placed chart elements, then laying out the user-placed chart element in the chart according to a user-specified layout.

12 Claims, 3 Drawing Sheets

METHOD, SYSTEM, AND COMPUTER-READABLE MEDIUM FOR THE LAYOUT OF AUTOMATICALLY-PLACED ELEMENTS AND USER-PLACED ELEMENTS IN A CHART

BACKGROUND OF THE INVENTION

Charting programs (such as spreadsheet application programs, word processing application programs, and presentation application programs) enable the creation of charts of various types from user provided data. Typically, charting programs generate charts having a fixed layout in which chart elements (e.g., titles, legends, plot area, etc.) are arranged according to a predefined format. Many users, however wish to retain some control of the layout of chart elements so that they have some control over the placement of these elements in order to effect the overall appearance of the chart, to conform to a presentation standard, or to emphasize a particular detail presented in the chart.

To that end, some charting programs have been developed which allow a user to change the location of certain chart elements by hand (i.e., manual layout). However, these charting programs fail to provide any assistance to the user to find appropriate locations for the remaining elements. For instance, a user may reposition and/or resize a legend in a bar chart while other elements automatically generated by the charting program (such as the plot area) remain unchanged. Furthermore, in current charting programs, a repositioned and/or resized chart element creates free space in the chart corresponding to the previous position of the element. In response to the free space created by the manual layout of chart elements, current charting programs expand the plot area of the chart to take up the free space created by manual layout elements. However, these methods often result in an unacceptable visual layout when the manual elements are laid out along with automatically positioned elements by the charting program.

It is with respect to these considerations and others that the various embodiments of the present invention have been made.

BRIEF SUMMARY OF THE INVENTION

In accordance with the present invention, the above and other problems are solved by a method, system, and computer-readable medium for determining a layout of automatically-placed elements and user-placed elements in a chart created in a chart application program. User-placed elements include chart elements that have been moved and/or resized by a user. Automatically-placed elements include chart elements that have been laid out according to an automatic position and size calculated by the chart application program.

According to one aspect of the invention, the method includes making a first "pass" of chart elements by selecting a group of automatically-placed chart elements and user-placed chart elements previously laid out in the chart and automatically laying out the automatically-placed chart elements and the user-placed chart elements according to an automatic position and size calculated by the chart application program. Thus, initially the chart layout is computed as if all chart elements are automatically-placed elements. The method further includes making a second pass of chart elements by reselecting each of the elements from among the automatically laid out elements in the chart, determining whether the selected chart element are user-placed chart elements, and if the selected chart element are user-placed chart elements, then laying out the user-placed chart element in the chart according to a user-specified layout. If any of the selected chart elements are not a user-placed chart element, then the automatic position and size previously calculated for these elements is maintained.

Laying out the user-placed element in the chart according to a user-specified layout may include repositioning and resizing the user-placed chart element according to the user's previous movement and/or resizing of the element in the chart. In laying out the user-placed chart element in the chart according to a user-specified layout the method may further include determining whether the user-placed chart element is associated with a data point in the chart, if the user-placed chart element is associated with a data point in the chart, then laying out the user-placed chart element as an offset from a data point reference location calculated according the user-specified layout, and if the user-placed chart element is not associated with a data point in the chart, then laying out the user-placed chart element as a proportion of the area of the chart calculated according to the user-specified layout.

In laying out the user-placed chart element as an offset from a data point reference location calculated according to the user-specified layout the method may further include calculating a layout position and a layout size of the user-placed chart element utilizing values representing a previously calculated size and position offset of center of the user-placed element from the data point reference location. In laying out the user-placed chart element as a proportion of the area of the chart calculated according to a the user-specified layout the method may further include calculating a layout position and a layout size of the user-placed chart element utilizing previously calculated ratios of the center, width, and height of the user-placed element to the width and height of the chart area.

Other aspects of the invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
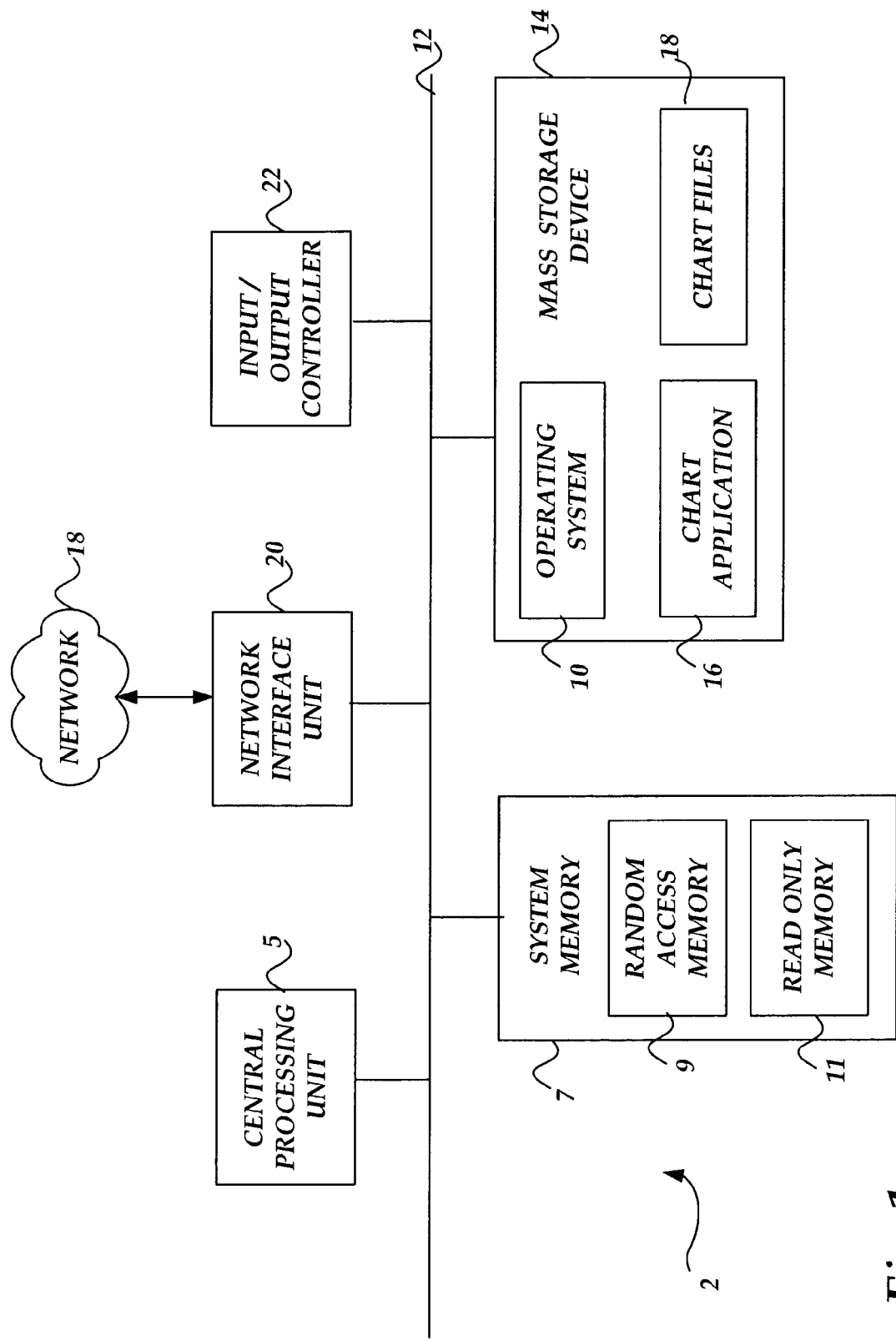
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The computer 2 is also capable of executing one or more application programs. In particular, the computer 2 is operative to execute a chart application 16. As known to those skilled in the art, the chart application 16 provides functionality for creating charts, including column charts, bar charts, X-Y charts, pie charts, radar charts, donut charts, and polar charts, from numerical and text data provided by a user. The chart application 16 also provides capabilities for applying a variety of formatting options for text, numeric values, and other features comprising a chart.

According to illustrative embodiments of the invention and as will be described in greater detail below, the chart application 16 may be utilized to determining a layout of automatically-placed and user-placed elements in a chart. As defined herein, "automatically-placed elements" are chart elements which correspond to a fixed position and size determined by the chart application 16. "User-placed elements" (or "manual layout elements") are chart elements that have been moved and/or resized by a user according to a user preference. It should be understood that in accordance with the various embodiments of the invention, a chart element is still considered a user-placed element even if it has been moved and/or resized back to an automatic position and size established by the chart application 16.

According to one embodiment of the invention, the chart application 16 comprises the OFFICE suite of application programs including the EXCEL spreadsheet application program, the WORD word processing application program, and the POWERPOINT presentation application program from MICROSOFT CORPORATION of Redmond, Wash. It should be appreciated, however, that the various aspects of the invention described herein may be utilized with other application programs from other manufacturers. Moreover, although the inventive aspects described herein are presented in the context of the application programs identified above, it should be appreciated that other types of application programs may also be utilized to embody the various aspects of the invention. Additional details regarding the various functions performed by the chart application 16 will be provided below with respect to FIGS. 2-3.

Figure 2:
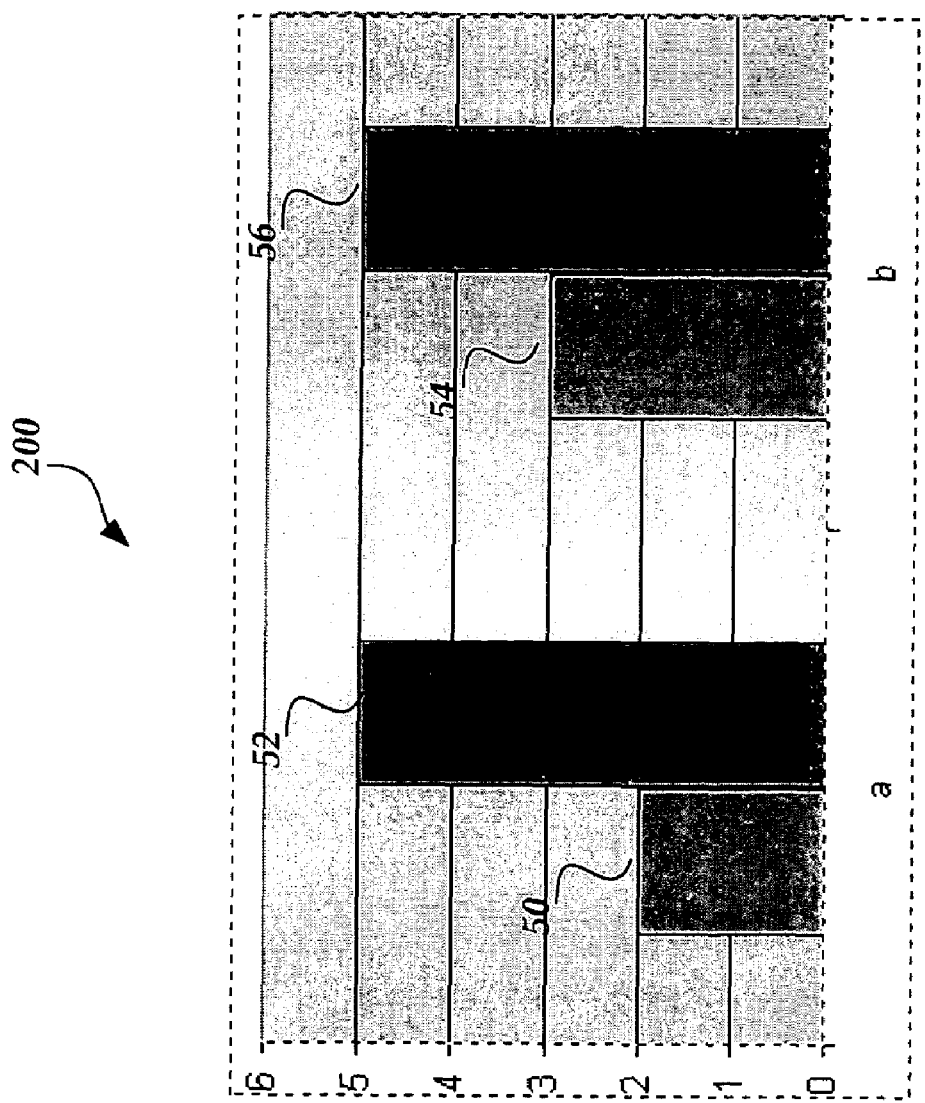
FIG. 2 is a screenshot of an illustrative chart which may be generated by the chart application program in the computer system of FIG. 1, according to an illustrative embodiment of the invention.

Referring now to FIG. 2, a screenshot of an illustrative chart 200 which may be generated by the chart application 16 according to an illustrative embodiment of the invention will be described. The chart 200 is a column chart which includes a plot area with data columns 50, 52, 54, and 56. Each data column 50, 52, 54, and 56 in the chart 200 corresponds to a numeric value along the chart's y-axis. The chart 200 will be referred to in the following description of FIG. 3, below.

Figure 3:
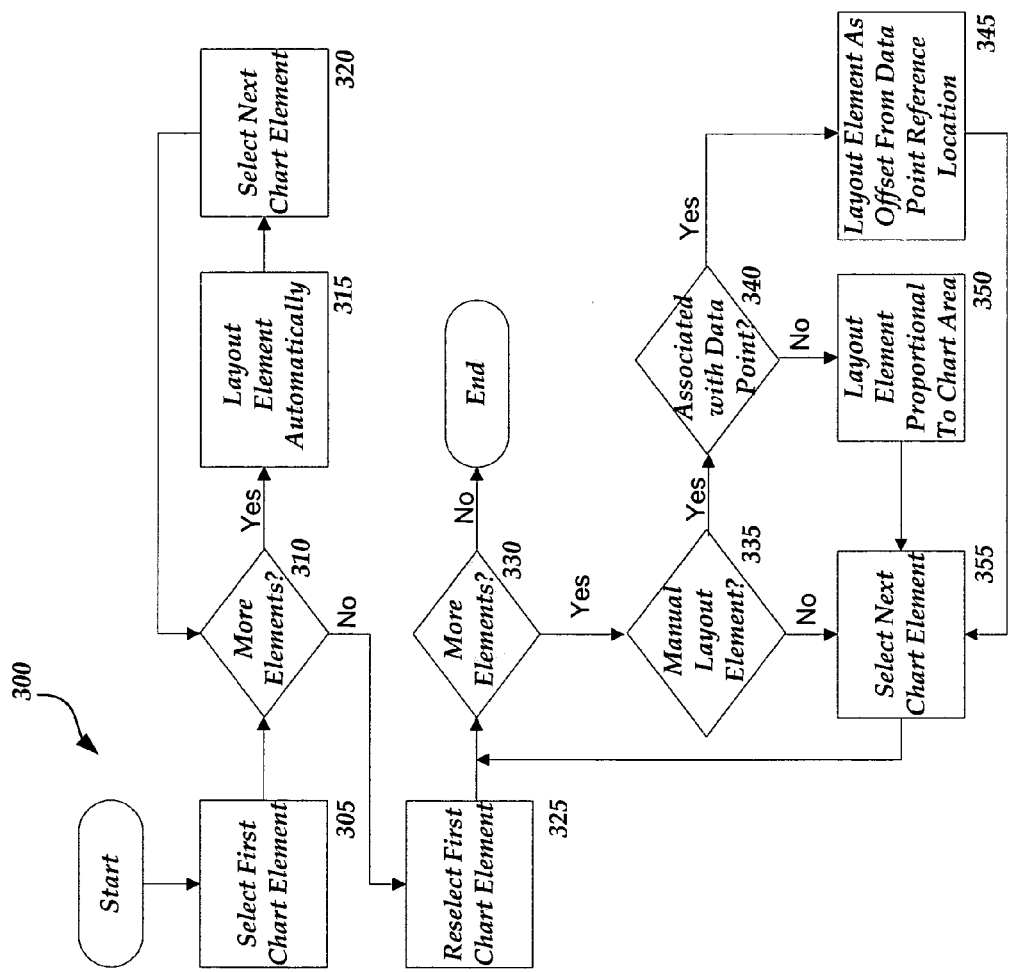
FIG. 3 is an illustrative routine performed by the chart application program in the computer system of FIG. 1 for determining a layout of automatically-placed elements and user-placed elements in a chart, according to an illustrative embodiment of the invention.

Referring now to FIG. 3, an illustrative routine 300 will be described illustrating a process performed by the chart application program 16 for determining a layout of automatically-placed elements and user-placed elements in a chart. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 3, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 300 begins at operation 305, wherein the chart application 16 selects a chart element from a chart created by the chart application 16. In particular, the chart application 16 may initiate a first "pass" of the chart elements by selecting the outermost element in the chart as a first chart element. The routine 300 continues at operation 310 where the chart application 16 determines whether the chart includes more chart elements in addition to the currently selected chart element. If, at operation 310, the chart application 16 determines that the chart includes more elements, then the routine 300 continues at operation 315 where the chart application 16 lays out the selected chart element as an automatically-placed element corresponding to a predetermined fixed position and size in the chart. It should be understood that according to the various embodiments of the invention, during the first "pass" of the chart elements, the chart application 16 lays out all of the elements as automatically-placed elements, even if an element is a user-placed or previously placed manual element. Thus, at operation 315, the user-placed elements are temporarily repositioned and resized from their user-selected positions and sized according to an automatic layout determined by the chart application 16. From operation 315, the routine 300 continues at operation 320 where the chart application 16 selects the next chart element in the chart. From operation 320, the routine 300 then returns to operation 310.

At operation 310, if the chart application 16 determines that the chart application 16 does not include more elements to be automatically laid out in the chart, the routine 300 then continues at operation 325 where the chart application 16 initiates a second "pass" of the automatically laid out chart elements by reselecting the first chart element at operation 325. The routine 300 then continues at operation 330 where the chart application 16 determines whether the chart includes more chart elements in addition to the currently selected chart element. If, at operation 330, the chart application 16 determines that the chart includes more elements, then the routine 300 continues at operation 335.

At operation 335, the chart application 16 determines whether the currently selected element is a manual layout or user-placed element. In particular, the chart application 16 recalls the previous position and size of the element prior to it being automatically laid out at operation 315. If at operation 335, the chart application 16 determines that the currently selected element is not a user-placed element (i.e., the element is an automatically-placed element), the routine 300 then branches to operation 355 where the chart application 16 selects the next element in the chart. It will be appreciated that when the chart application 16 determines an automatically-placed chart element during the second "pass" through the chart, the current position and size of the automatically-placed element is maintained during the re-layout of the chart. However, as will be described in greater detail below, user-placed or manual layout chart elements are resized and repositioned by the chart application 16 according to the layout previously specified by a user (i.e., by manually resizing and/or repositioning the chart element).

If at operation 335, the chart application determines that the currently selected element is a manual layout or user-placed element, then the routine 300 continues at operation 340 where the chart application 16 determines whether the user-placed element is associated with a data point in the chart. For instance, a user-placed chart element associated with a data point may be a column associated with a specific numeric value in the plot area of a column chart such as the column 52 in the chart 200 of FIG. 2 described above. If, at operation 340, it is determined that the user-placed element is not associated with a data point in the chart, then the routine 300 continues to operation 350. If, on the other hand, it is determined that the user-placed element is not associated with a data point in the chart, then the routine 300 branches to operation 350.

At operation 345, the chart application 16 lays out the user-placed element associated with the data point as a position offset from a "reference location" of the data point. In particular, the user-placed element associated with the data point is repositioned and resized as a position offset from the reference location of the data point. In accordance with one illustrative embodiment, the reference location of a data point is the value indicating the location of the data point chart element. For instance, in the chart 200 of FIG. 2, the reference location for the column 52 would be the numeric value "5" corresponding to the top of the column. In a line chart, the reference location would be the center of the data point marker. According to the various embodiments of the invention, the "offset" is a (x-linear, y-linear) position offset for charts with linear axes (such as column and x-y charts) and a (radial-linear, angular) position offset for charts with a polar axis (such as pie charts and polar charts). It will be appreciated that when a user initially manipulates a data-point associated chart element (thus making it a user-placed or manual layout element), the chart application 16 calculates the size of the element and the position offset of the element from the data point reference location. The chart application 16 utilizes the calculated values to calculate the position and size of the user-placed chart element during the layout process. From operation 345, the routine 300 then branches to operation 355 where the chart application 16 selects the next element in the chart.

Returning now to operation 340, if the user-placed element is not associated with a data point (e.g., a chart title or legend), then the routine 300 branches to operation 350. At operation 350, the chart application 16 lays out the user-placed element as a proportion of the chart area. That is, the user-placed element is repositioned and resized as a proportion of the current chart area. In particular, when a user manipulates a chart element thus making it a user-placed or manual layout chart element, the chart application 16 calculates the ratios of the center, width, and height of a bounding box (not shown) surrounding the chart element to the width and height of the current chart area. The chart application 16 utilizes these calculated ratios to calculate the position and size of the user-placed element during the chart layout process. The routine 300 then continues from operation 350 at operation 355 where the chart application 16 selects the next element in the chart.

From operation 355, the routine 300 returns to operation 330 where the chart application 16 determines if there are more elements in the current chart to be laid out. If there are any remaining elements in the chart, then the routine 300 returns to operation 340. If there are no remaining elements in the chart, then the routine 300 ends.

Based on the foregoing, it should be appreciated that the various embodiments of the invention include a method, system, and computer-readable medium for determining a layout of automatically-placed elements and user-placed elements in a chart created in a chart application program. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for determining a layout of automatically-placed elements and user-placed elements in a chart created in a chart application program, comprising:
   (a) receiving data describing a chart including a plurality of chart elements in the chart, wherein the plurality of chart elements includes one or more automatically-placed chart elements laid out according to an automatic layout applicable to each of the chart elements and one or more user-placed chart elements, wherein a user layout of each of the user-placed elements has been previously specified by a user;
   (b) automatically laying out the each of the plurality of chart elements in the chart according to the automatic layout applicable to each of the chart elements;
   (c) selecting a first chart element from among the plurality of chart elements as a current chart element;
   (d) determining whether the current chart element includes a user-placed chart element;
   (e) if the current chart element includes a user-placed chart element, then applying the user layout of the user-placed element to the user-placed chart element; wherein laying out the user-placed chart element in the chart according to a user-specified layout comprises: determining whether the user-placed chart element is associated with a data point in the chart; if the user-placed chart element is associated with a data point in the chart, then laying out the user-placed chart element as an offset from a data point reference location calculated according the user-specified layout; and if the user-placed chart element is not associated with a data point in the chart, then laying out the user-placed chart element as a proportion of the area of the chart calculated according to the user-specified layout;
   (f) selecting the next chart element in the chart as the current chart element; and
   (g) repeating the operations (c)-(f) for each of the plurality of chart elements in the chart until each of the user-placed chart elements are laid out in the chart.

2. The method of claim 1, wherein if the current chart element does not include a user-placed chart element, then selecting the next chart element in the chart as the current chart element.

3. The method of claim 1, wherein laying out the user-placed element in the chart according to a user-specified layout comprises repositioning and resizing the user-placed chart element according to a previous user manipulation.

4. The method of claim 1, wherein laying out the user-placed chart element as the offset from a data point reference location calculated according to the user-specified layout comprises calculating a layout position and a layout size of the user-placed chart element utilizing values representing a previously calculated size and position offset of center of the user-placed element from the data point reference location.

5. The method of claim 1, wherein laying out the user-placed chart element as a proportion of the area of the chart calculated according to the user-specified layout comprises calculating a layout position and a layout size of the user-placed chart element utilizing previously calculated ratios of the center, width, and height of the user-placed element to the width and height of the chart area.

6. A system for determining a layout of automatically placed elements and user-placed elements in a chart, comprising a client computer operative to execute a chart application program for laying out a plurality of chart elements, the chart application program further operative to:
   (a) receiving data describing a chart including a plurality of chart elements in the chart, wherein the plurality of chart elements includes one or more automatically-placed chart elements laid out according to an automatic layout applicable to each of the chart elements and one or more user-placed chart elements, wherein a user layout of each of the user-placed elements has been previously specified by a user;
   (b) automatically laying out the each of the plurality of chart elements in the chart according to the automatic layout applicable to each of the chart elements;
   (c) selecting a first chart element from among the plurality of chart elements as a current chart element;
   (d) determining whether the current chart element includes a user-placed chart element;
   (e) if the current chart element includes a user-placed chart element, then applying the user layout of the user-placed element to the user-placed chart element by one or more of:
      repositioning and resizing the user-placed chart element according to a previous user manipulation; and
      when the user-placed chart element is associated with a data point in the chart, laying out the user-placed chart element as an offset from a data point reference location calculated according the user-specified layout; wherein laying out the user-placed chart element as the offset from a data point reference location calculated according to the user-specified layout comprises calculating a layout position and a layout size of the user-placed chart element utilizing values representing a previously calculated size and position offset of center of the user-placed element from the data point reference location; and
      when the user-placed chart element is not associated with a data point in the chart, then laying out the user-placed chart element as a proportion of the area of the chart calculated according to the user-specified layout;
   (f) selecting the next chart element in the chart as the current chart element; and
   (g) repeating the operations (c)-(f) for each of the plurality of chart elements in the chart until each of the user-placed chart elements are laid out in the chart.

7. The system of claim 6, wherein if the current chart element does not include a user-placed chart element, then selecting the next chart element in the chart as the current chart element.

8. The system of claim 6, wherein laying out the user-placed chart element as a proportion of the area of the chart calculated according to the user-specified layout comprises calculating a layout position and a layout size of the user-placed chart element utilizing previously calculated ratios of the center, width, and height of the user-placed element to the width and height of the chart area.

9. A computer-readable storage medium storing instructions executable by a computing system to generate a chart, the instructions being configured to:
  receive data describing a chart generated from a set of data, the chart having been previously generated and presenting a plurality of elements including:
    at least one automatically-placed element having a position and a size specified by an automatic layout; and
    at least one user-placed element wherein at least one of the position and the size of the user-placed element has been previously specified by a user in a user layout different from that specified by the automatic layout; and
  regenerating the chart by regenerating each of the plurality of elements, including:
    generating each of the plurality of elements according to the automatic layout;
    identifying the at least one user-placed element; and
    regenerating the at least one user-placed element to present the at least one user-placed element according to user layout instead of the automatic layout; wherein regenerating the user-placed element includes: determining whether the user-placed element is associated with a data point in the chart; when the user-placed element is associated with the data point in the chart, then one of resizing and repositioning the user-placed element as an offset from a data point reference location calculated according the user layout; and when the user-placed chart element is not associated with the data point in the chart, then one of resizing and repositioning the user-placed element in proportion to the area of the chart calculated according to the user-specified layout; and
  presenting the regenerated chart.

10. The computer-readable storage medium of claim 9, wherein regenerating the user-placed element includes at least one of repositioning and resizing the user-placed element according to the previously specified user layout.

11. The computer-readable storage medium of claim 9, wherein one of resizing and repositioning the user-placed element as an offset from a data point reference location calculated according the user layout includes calculating a layout position and a layout size of the user-placed chart element utilizing values representing a previously calculated size and position offset of center of the user-placed element from the data point reference location.

12. The computer-readable storage medium of claim 9, wherein one of resizing and repositioning the user-placed element as an offset from a data point reference location calculated according the user layout includes calculating a layout position and a layout size of the user-placed chart element utilizing previously calculated ratios of the center, width, and height of the user-placed element to the width and height of a chart area.

* * * * *